(12) United States Patent
Yee et al.

(10) Patent No.: US 11,699,180 B2
(45) Date of Patent: *Jul. 11, 2023

(54) COMPUTER-IMPLEMENTED METHODS FOR TECHNOLOGICAL APPLICATIONS INVOLVING PROVISION OF AN ONLINE PORTAL FOR MANAGING A USER ACCOUNT INCLUDING AN INTERACTIVE GUI HAVING FUNCTIONALITY FOR PRE-AUTHORIZING FUTURE TRANSACTIONS

(71) Applicant: Capital One Services, LLC, McLean, VA (US)

(72) Inventors: Bryant Yee, Washington, DC (US); George Bergeron, Falls Church, VA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,119

(22) Filed: Nov. 30, 2021

(65) Prior Publication Data

US 2022/0084105 A1  Mar. 17, 2022

Related U.S. Application Data

(63) Continuation of application No. 16/840,438, filed on Apr. 5, 2020, now Pat. No. 11,188,972, which is a
(Continued)

(51) Int. Cl.
*G06Q 30/00* (2023.01)
*G06Q 30/0601* (2023.01)
*G06Q 20/38* (2012.01)

(52) U.S. Cl.
CPC ....... *G06Q 30/0635* (2013.01); *G06Q 20/385* (2013.01); *G06Q 30/0641* (2013.01)

(58) Field of Classification Search
CPC ........ G06Q 30/0601–0645; G06Q 20/00–387; G06Q 40/02
(Continued)

(56) References Cited

U.S. PATENT DOCUMENTS 8,132,719 B2   3/2012   Walker
8,463,629 B2   6/2013   Neulight
(Continued)

OTHER PUBLICATIONS

Gunaratne, Junius. "Influencing Financial Decision-Making through Human-Computer Interaction Design Interventions." Order No. 10603102 New York University Tandon School of Engineering, 2017. Ann Arbor: ProQuest. Web. Sep. 27, 2022. (Year: 2017).*
(Continued)

*Primary Examiner* — Michael Misiaszek
*Assistant Examiner* — Kennedy Gibson-Wynn
(74) *Attorney, Agent, or Firm* — Greenberg Traurig, LLP

(57) ABSTRACT

Systems and methods involving a computer-implemented portal that enables a user to pre-authorize purchase of items not yet available for sale are disclosed. In one embodiment, an exemplary method may comprise: providing an online portal that enables a user to manage a financial account; executing a first routine of the portal including interactive functionality enabling the user to specify and pre-authorize purchase of an item that is not yet available for sale; searching to determine at least one electronic source at which the item can be purchased when it becomes available for purchase; and executing a purchase transaction at the future date/time when the item is released for sale, to purchase the item for the user.

20 Claims, 9 Drawing Sheets

Related U.S. Application Data continuation of application No. 16/597,246, filed on Oct. 9, 2019, now Pat. No. 10,650,440.

(58) Field of Classification Search
USPC .............................................. 705/26.1–27.2
See application file for complete search history.

(56) References Cited

U.S. PATENT DOCUMENTS

| | | | |
|---|---|---|---|
| 10,650,440 | B1 | 5/2020 | Yee et al. |
| 2006/0253579 | A1 | 11/2006 | Dixon |
| 2009/0188983 | A1 | 7/2009 | Walker |
| 2012/0095872 | A1 | 4/2012 | Hurwitz |
| 2012/0191565 | A1 | 7/2012 | Blank |
| 2014/0136365 | A1* | 5/2014 | Nista ............... G06Q 30/06 705/26.1 |
| 2014/0143021 | A1 | 5/2014 | Niles |
| 2015/0324853 | A1* | 11/2015 | Damiano ........... H04L 67/55 705/7.19 |
| 2016/0275590 | A1 | 9/2016 | Todasco |
| 2017/0178164 | A1 | 6/2017 | Ghosh |
| 2017/0372396 | A1 | 12/2017 | Jones |
| 2018/0197177 | A1 | 7/2018 | Lee |
| 2018/0240182 | A1 | 8/2018 | Schonfeld |
| 2019/0318418 | A1* | 10/2019 | Khurana ........... G06Q 30/0635 |

OTHER PUBLICATIONS

"Be Sure to Get what You Want at the Best Price this Holiday." Business Wire, Dec. 1, 2004, p. 1. ProQuest. Web. Feb. 24, 2023 . (Year: 2004).*

[Author anonymous], "Rowland's Classic Clothing: Rowland's Classic Clothing Expands Business with Integrated Mail Order and Retail Systems from Options . . . by mail order and from its new website," M2 Presswire [Coventry], Oct. 23, 2008, pp. 1-3.

Rory Van Loo, "Digital Market Perfection", Mar. 2019, pp. 815-883 (69 pgs), Michigan Law Review [vol. 117.815].

* cited by examiner

FIG. 9

COMPUTER-IMPLEMENTED METHODS FOR TECHNOLOGICAL APPLICATIONS INVOLVING PROVISION OF AN ONLINE PORTAL FOR MANAGING A USER ACCOUNT INCLUDING AN INTERACTIVE GUI HAVING FUNCTIONALITY FOR PRE-AUTHORIZING FUTURE TRANSACTIONS

CROSS-REFERENCE TO RELATED APPLICATIONS INFORMATION

The present application is a continuation of U.S. patent application Ser. No. 16/840,438, filed Apr. 5, 2020, now U.S. Pat. No. 11,188,972, which is a continuation of application Ser. No. 16/597,246, filed Oct. 9, 2019, now U.S. Pat. No. 10,650,440, all of which are incorporated herein by reference in entirety.

FIELD OF TECHNOLOGY

The present disclosure generally relates to an improved computer-based platform or system, improved computing components and devices and/or improved computing methods configured for one or more novel technological applications of providing portals for managing a user account including interactive GUIs having functionality for pre-authorizing and executing purchase transactions in the future.

BACKGROUND OF TECHNOLOGY

A computer network platform/system may include a group of computers (e.g., clients, servers, smart routers, etc.) and other computing hardware devices that are linked together through one or more communication channels to facilitate communication, resource-sharing and/or electronic transactions, via one or more specifically programmed graphical user interfaces (GUIs) of the present disclosure.

SUMMARY OF DESCRIBED SUBJECT MATTER

In some embodiments, the present disclosure provides various exemplary technically improved computer-implemented methods, such as a method including steps such as:

providing, by at least one online computer platform, an online portal that is configured to enable a user to manage at least one account or at least one monetary asset of the user online;

providing, by the at least one computer platform, via the online portal, an interactive routine enabling the user to define at least one pre-authorized purchase that pre-authorizes automated online acquisition of at least one item that is not available for sale until a future date;

searching, by the at least one online computer platform, to determine at least one electronic source at which the at least one item can be purchased when the at least one item becomes available for purchase at the future date; and executing, by the at least one online computer platform, at least one online purchase transaction, on (1) the future date or (2) the future date and the future time when the at least one item is released for sale, to purchase the at least one item for the user.

In some embodiments, the interactive routine may include one or both of:

providing at least one first graphical user element enabling the user to specify an amount of money to hold for the at least one pre-authorized purchase, wherein the at least one online computer platform causes to reserve the amount of money for the at least one pre-authorized purchase such that the user cannot access/spend the amount; and providing at least one second graphical user element enabling the user to specify at least one of: (1) URL information regarding at least one universal resource locator (URL) to which the at least one online computer platform should navigate to make the at least one purchase, (2) a future date at which the at least one item will be released for sale, and (3) the future date and a future time at which the at least one item will be released for sale.

In some embodiments, the present disclosure also provides exemplary technically improved computer-based systems and computer-readable media, including media embodied in an application ("App"), whether resident on a device, provided for download via a server and/or executed in connection with a browser extension application, that include or involves features, functionality, components and/ or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 9 is a diagram of a user interface illustrating exemplary aspects of an online portal showing various features

DETAILED DESCRIPTION

Figure 1:
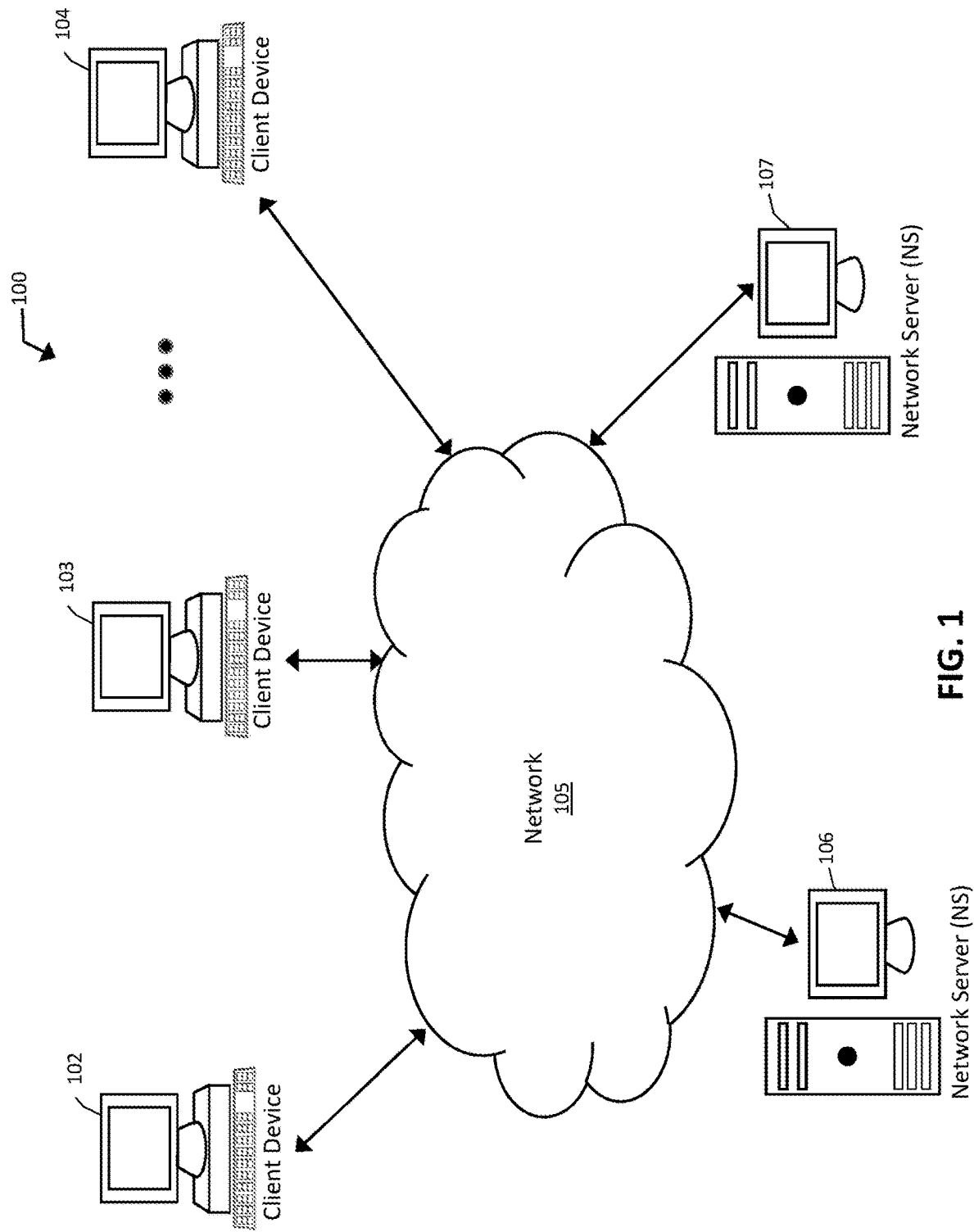
FIG. 1 is a block diagram depicting an exemplary computer-based system and platform, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, a virtually generated display, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, smart watch, wearable computer or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

Figure 3:
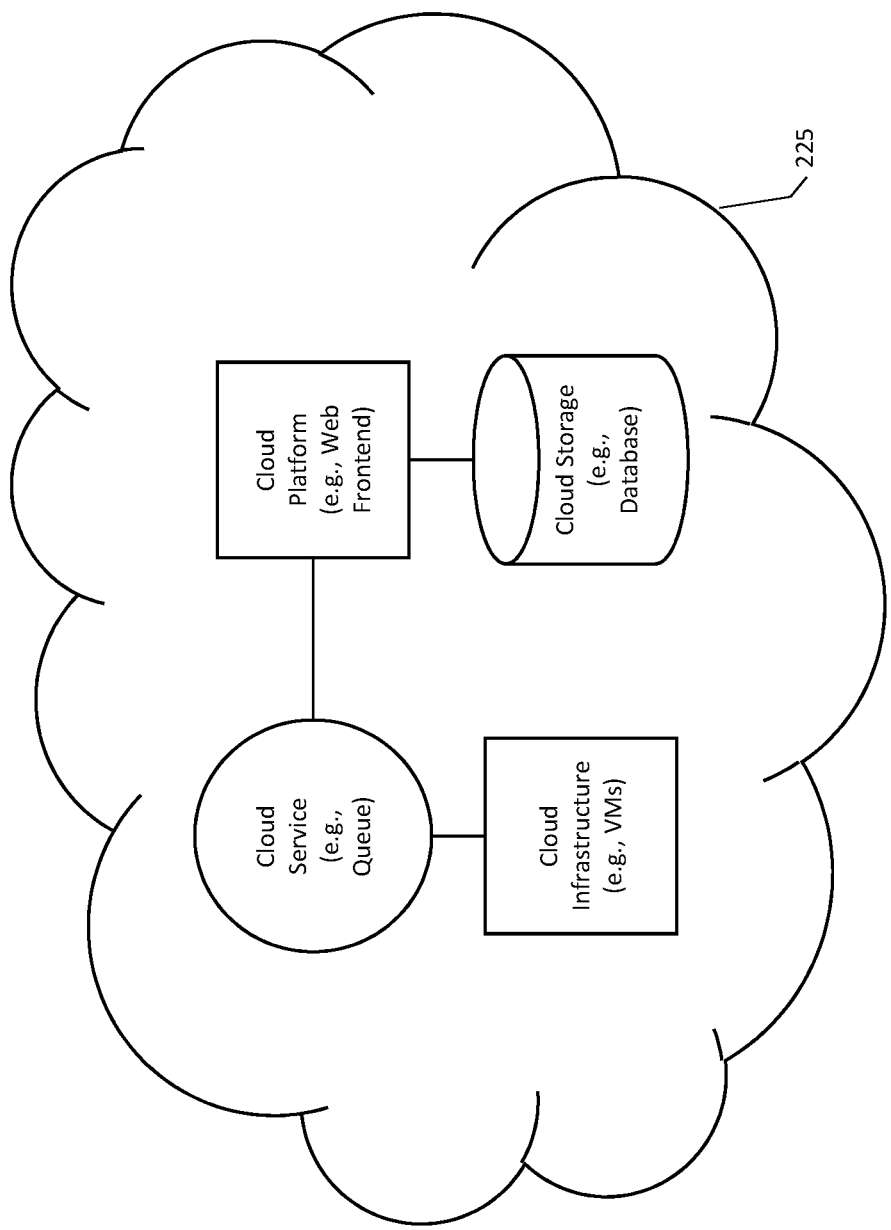
FIGS. 3 and 4 are diagrams illustrating two exemplary implementations of cloud computing architecture/aspects with respect to which the disclosed technology may be specifically configured to operate, in accordance with one or more embodiments of the present disclosure.
Figure 4:
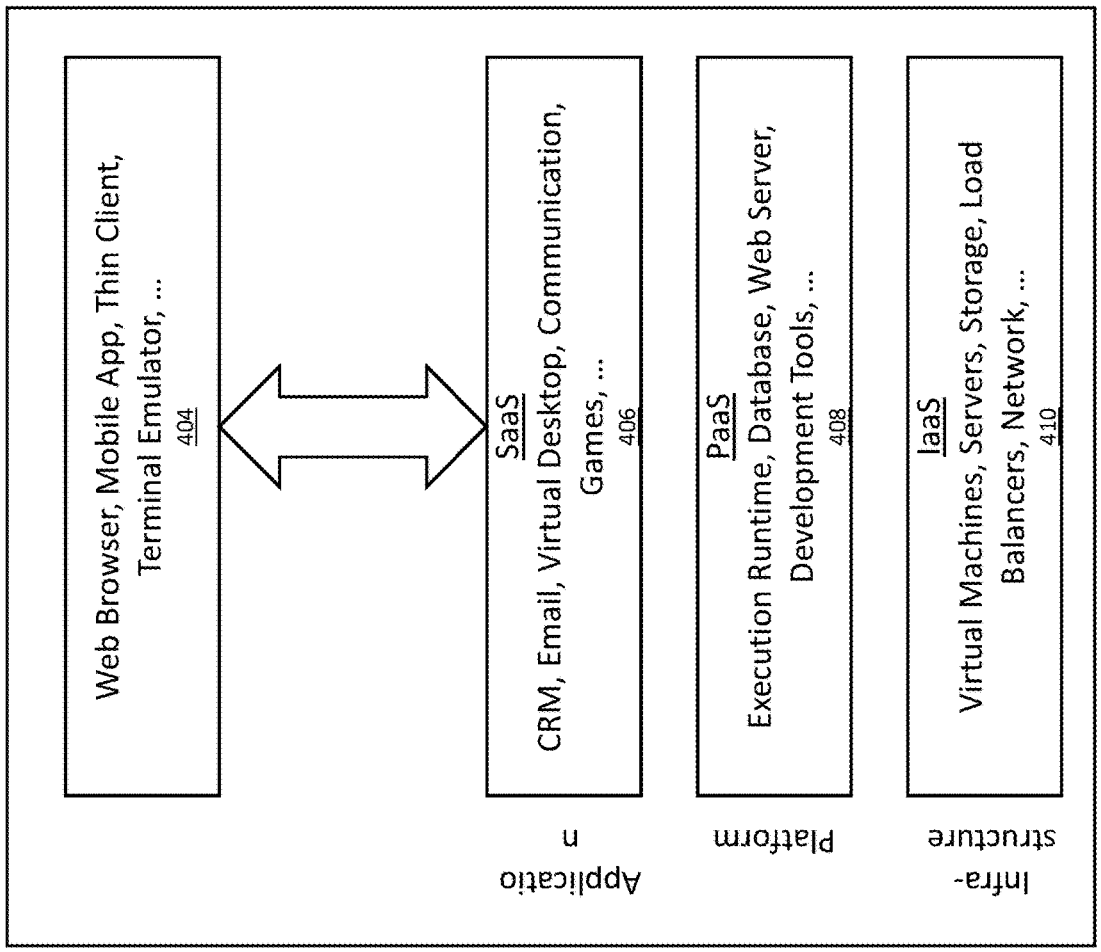

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). Examples of such cloud components are shown in FIGS. 3-4.

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members (e.g., clients, and their users) and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XMIL, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer- or machine-readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (TRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
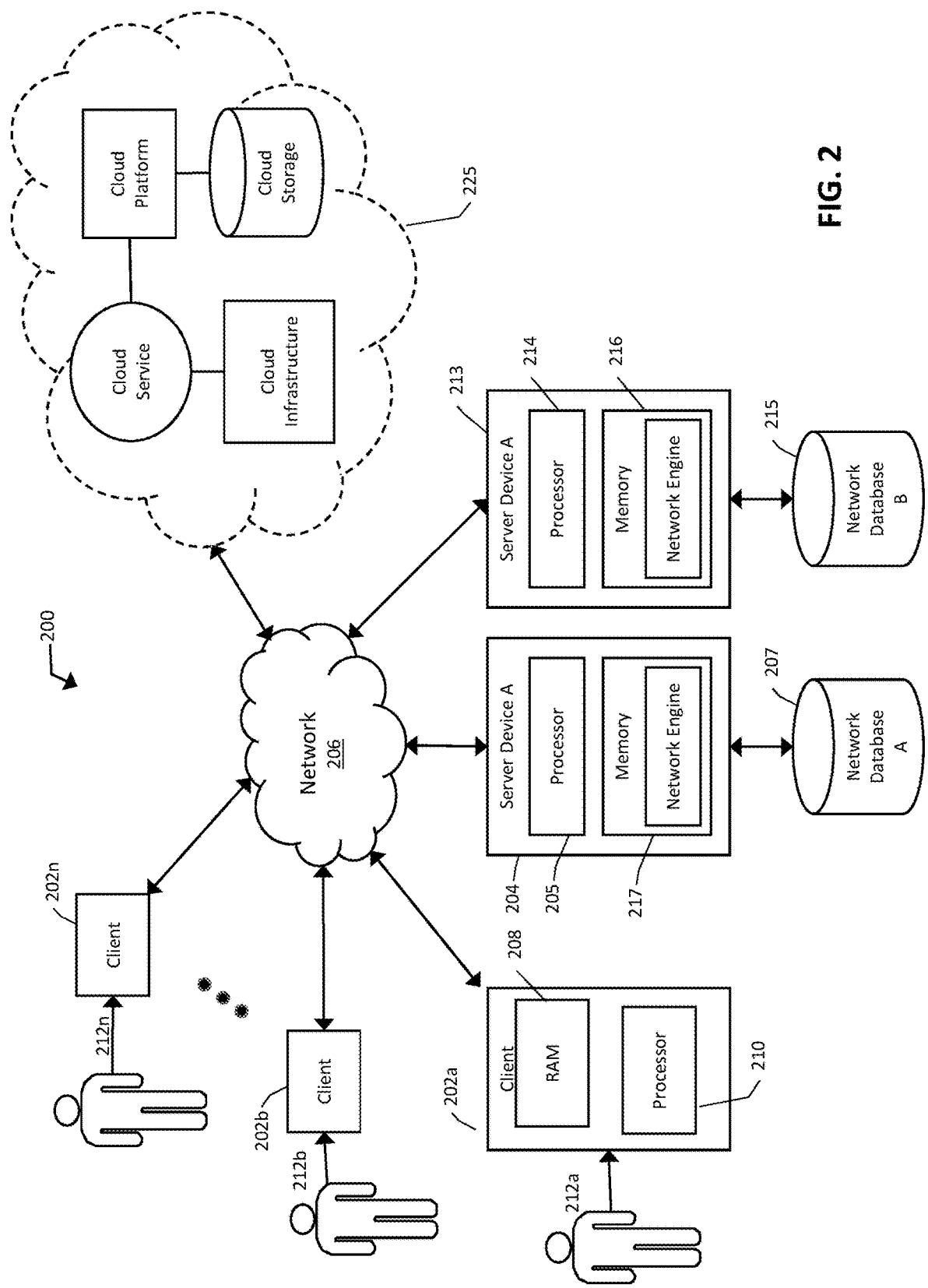
FIG. 2 is a block diagram depicting another exemplary computer-based system and platform, in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through n may be specifically programmed with one or more application programs in accordance with one or more principles/methodologies detailed herein. In some embodiments, member computing devices 202*a* through *n* may operate on any operating system capable of supporting a browser or browser-enabled application, such as Microsoft™, Windows™, and/or Linux. In some embodiments, member computing devices 202*a* through *n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202*a* through *n*, users, 212*a* through *n*, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202*a* through *n* may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 406, 408, 410 may be utilized in connection with the Web browser and browser extension aspects, shown at 404, to achieve the innovations herein.

Figure 5:
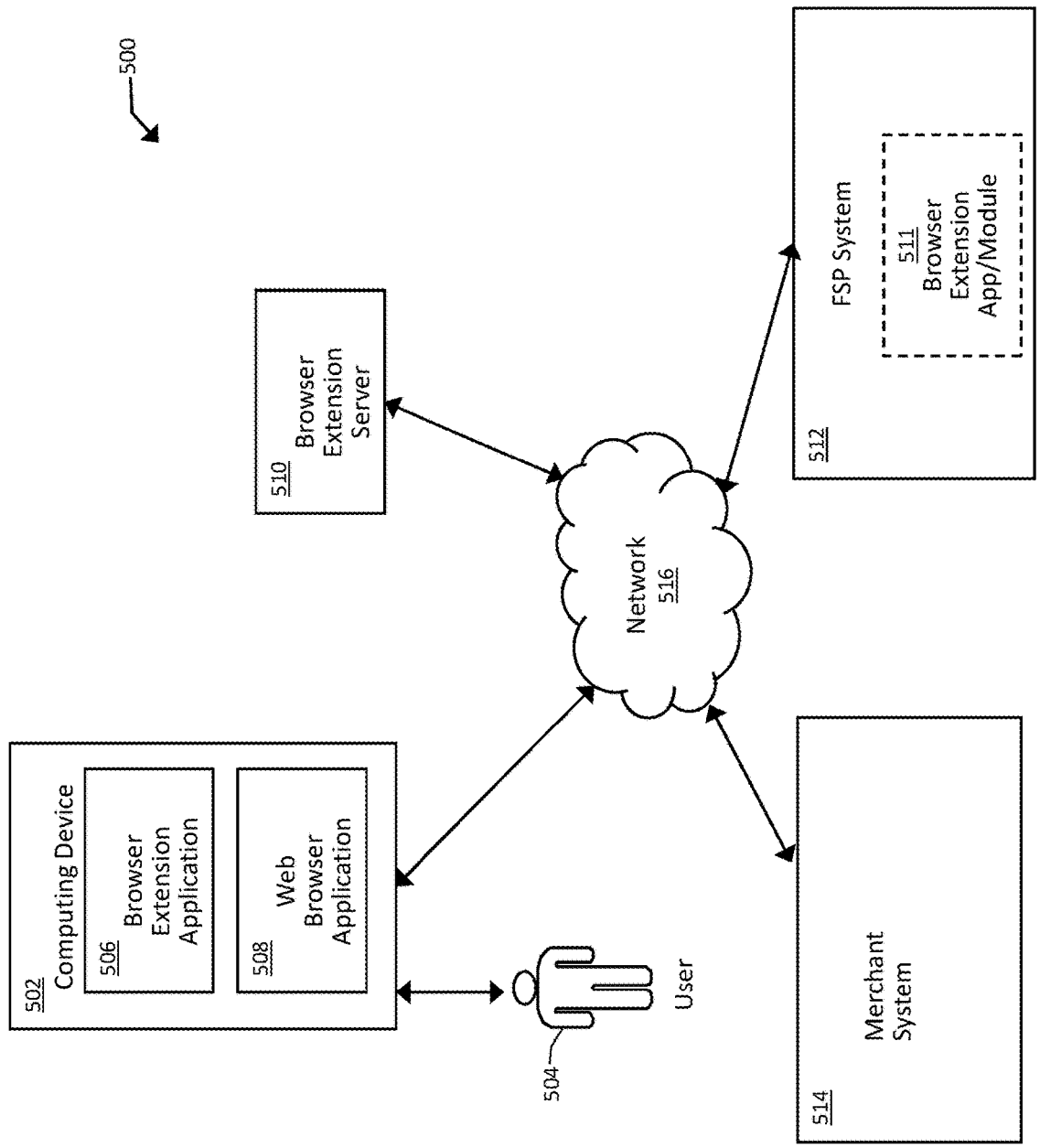
FIG. 5 is a block diagram of an exemplary system involving features of pre-authorization and purchase processing consistent with exemplary aspects of at least some embodiments of the present disclosure.

FIG. 5 is a block diagram of an exemplary system 500, consistent with disclosed embodiments. System 500 may be configured for executing a software application having a browser extension process consistent with disclosed embodiments. As shown, system 500 may include a computing device 502 associated with a user 504. Computing device 502 may be configured to execute, among other programs, a web browser application 508 and a browser extension application 506. System 500 may further include a browser extension server 510, a financial service provider (FSP) system 512, and a merchant system 514. As shown, computing device 502, browser extension server 510, FSP system 512, and merchant system 514 may be communicatively coupled by a network 516. The functionality and benefits of browser extension server 510 may also be achieved via a browser extension server or module 511 within, or more directly associated with, at least one merchant system 514, for example. For simplicity of explanation, the behavior of one or both of such server 510 and/or module 511 are discussed below by reference to just the browser extension server, i.e., 510.

While only one computing device 502, browser extension server 510 (also module 511), FSP system 512, merchant system 514, and network 516 are shown, it will be understood that system 500 may include more than one of any of these components. More generally, the components and arrangement of the components included in system 500 may vary. Thus, system 500 may include other components that perform or assist in the performance of one or more processes consistent with the disclosed embodiments. Computing device 502 may be one or more computing devices configured to perform operations consistent with executing browser extension application 506 and with executing web browser application 508. Computing device 502 is further described below in connection with FIG. 7.

Browser extension application 506 may be one or more software applications configured to perform operations consistent with searching and obtaining desired information from web pages, as disclosed herein. For example, browser extension application 506 may be configured to perform screen scraping functionality associated with determining website and/or related information related to the item desired by the user 504. Such processing may occur by or with the browser extension application 506, or the browser extension application 506 may transmit requests to and/or operate with one or more other software applications and/or computing components to search for and obtain the desired information.

Web browser application 508 may be one or more software applications configured to perform operations consistent with providing web pages to the user, such as web pages associated with merchants. The web pages may include transaction functionality including purchase information for goods, events or experiences that the user purchases via such web pages. Web browser application 508 is further described below in connection with FIG. 7.

Browser extension server 510 may be one or more computing devices configured to perform operations consistent with providing browser extension application 506. Browser extension server 510 may be further configured to perform operations consistent with processing online activities with merchants via the browser extension application 506 for detecting online transactions and determining purchase-related information for same. Browser extension server 510 is further described below in connection with FIG. 6.

FSP system 512 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 512 may be one or more computing devices configured to perform operations consistent with servicing or maintaining financial service accounts, including a financial service account associated with user 504. FSP system 512 may be further configured to process financial transactions associated with such financial service accounts, including authenticating and performing fraud detection regarding such transactions. In particular, FSP system 512 may be configured to perform such processing of financial transactions associated with a financial service account associated with user 504. In some embodiments, FSP system 512 may be further configured to generate content for a display device included in, or connected to, computing device 502, such as through a desktop or mobile banking or other application on computing device 502. Alternatively or additionally, FSP system 512 may be configured to provide content through one or more web pages or online portals that are accessible by computing device 502 over network 516. The disclosed embodiments are not limited to any particular configuration of FSP system 512.

While browser extension server 510 and FSP system 512 are shown separately, in some embodiments browser extension server 510 may include or be otherwise related to FSP system 512. For example, in some embodiments the facility of browser extension server 510 may be provided instead by FSP system 512, or vice versa. Alternatively or additionally, in some embodiments, browser extension server 510 may be included in, and/or be otherwise related to, any other entity in system 500 and/or a third-party not shown in system 500. Alternatively or additionally, browser extension server 510 may be a standalone server. Browser extension server 510 may take other forms as well. Among other implementations, for example, the functionality and benefits of browser extension server 510 may also be achieved via a browser extension server or module 511 within, or more directly associated with, at least one merchant system 514.

Merchant system 514 may be one or more computing devices configured to perform operations consistent with providing web pages that are accessible by computing device 502 over network 516. For example, the web pages may be provided at computing device 502 through web browser application 508. In some embodiments, merchant system 514 may be associated with a merchant that provides goods or services. Further, in some embodiments, the web pages may be online retail web pages through which user 504 may engage with in connection with determining the merchant's goods or services that the user wishes to purchase in the future, when they become available for sale. Other web pages are possible as well. The disclosed embodiments are not limited to any particular configuration of merchant system 514.

In some embodiments, merchant system 514 may include a merchant payment system 518. Merchant payment system 518 may be one or more computing devices configured to perform operations consistent with providing, within the web pages provided by merchant system 514, a merchant-provided payment process through which user 504 may engage in purchase transactions to purchase the merchant's goods or services. In some embodiments, merchant payment system 518 may be provided by the merchant in connection with one or more financial service providers, such as the financial service provider associated with FSP system 512 or another financial service provider. The payment process may, for example, be the same as or similar to MasterPass™, PayPal®, or Visa® Checkout. Other payment processes are possible as well.

Network 516 may be any type of network configured to provide communication between components of system 500. For example, network 516 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 500. In other embodiments, one or more components of system 500 may communicate directly through a dedicated communication link(s).

It is to be understood that the configuration and boundaries of the functional building blocks of system 500 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 6:
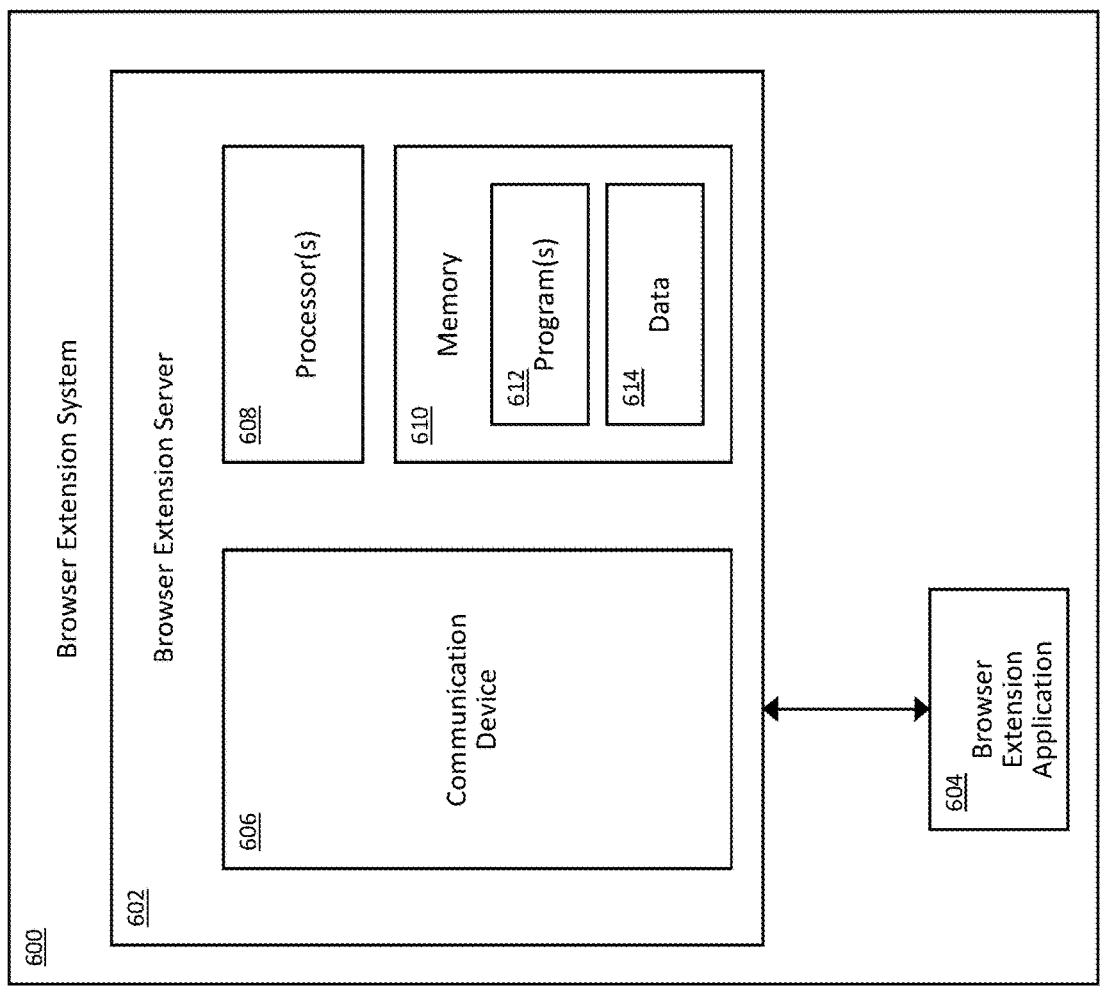
FIG. 6 is a block diagram of an exemplary system with browser extension server and a browser extension application consistent with exemplary aspects of at least some embodiments of the present disclosure.

FIG. 6 is a block diagram of an exemplary browser extension system 600, consistent with disclosed embodiments. As shown, browser extension system 600 may include browser extension server 602 and browser extension application 604. Browser extension server 602 may include a communication device 606, one or more processor(s) 608, and memory 610 including one or more programs 612 and data 614. Browser extension server 602 may be configured to perform operations consistent with providing browser extension application 604.

Browser extension server 602 may take the form of a server, general purpose computer, mainframe computer, or any combination of these components. Other implementations consistent with disclosed embodiments are possible as well. Browser extension application 604 may take the form of one or more software applications stored on a computing device, such as browser extension application 506 stored on computing device 502 described above.

Communication device 606 may be configured to communicate with one or more computing devices, such as computing device 502. In some embodiments, communication device 606 may be configured to communicate with the computing device(s) through browser extension application 604. Browser extension server 602 may, for example, be configured to provide instructions and/or operating information to browser extension application 604 through communication device 606. Communication device 606 may be configured to communicate other information as well.

Communication device 606 may be further configured to communicate with one or more FSP systems, such as FSP system 512 described above. In some embodiments, the FSP system may provide a financial service account associated with a computing device, and communication device 606 may be configured to communicate with the FSP system(s) to generate, transmit and/or process security-related information or instructions regarding the financial service account associated with the computing device. Communication device 606 may be configured to communicate with the FSP system(s) in other manners. Communication device 606 may be configured to communicate with other components as well.

Processor(s) 608 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. Si, . . . processors) family manufactured by Apple™, or any of various processors manufactured by Sun Microsystems, for example. The disclosed embodiments are not limited to any type of processor(s) otherwise configured to meet the computing demands required of different components of browser extension system 600.

Memory 610 may include one or more storage devices configured to store instructions used by processor(s) 608 to perform functions related to disclosed embodiments. For example, memory 610 may be configured with one or more software instructions, such as program(s) 612, that may perform one or more operations when executed by processor(s) 608. The disclosed embodiments are not limited to separate programs or computers configured to perform dedicated tasks. For example, memory 610 may include a single program 612 that performs the functions of browser extension system 600, or program(s) 612 may comprise multiple programs. Memory 610 may also store data 614 that is used by program(s) 612.

In certain embodiments, memory 610 may store sets of instructions for carrying out the processes described below in connection with FIG. 8. Other instructions are possible as well. In general, instructions may be executed by processor(s) 608 to perform one or more processes consistent with disclosed embodiments. In some embodiments, program(s) 612 may include one or more subcomponents configured to generate and/or process instructions and information for use by browser extension application 604 in performing searching and/or performing other processing related to purchasing the item.

The components of browser extension system 600 may be implemented in hardware, software, or a combination of both hardware and software, as will be apparent to those skilled in the art. For example, although one or more components of browser extension system 600 may be implemented as computer processing instructions, all or a portion of the functionality of browser extension system 600 may be implemented instead in dedicated electronics hardware. In some embodiments, browser extension system 600 may also be communicatively connected to one or more database(s) (not shown). Alternatively, such database(s) may be located remotely from browser extension system 600. Browser extension system 600 may be communicatively connected to such database(s) through a network, such as network 516 described above. Such database(s) may include one or more memory devices that store information and are accessed and/or managed through browser extension system 600. In some embodiments, one or both of processing online transactions and the disclosed browser extension functionality may be implemented with, or by involving, such database(s). By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

Figure 7:
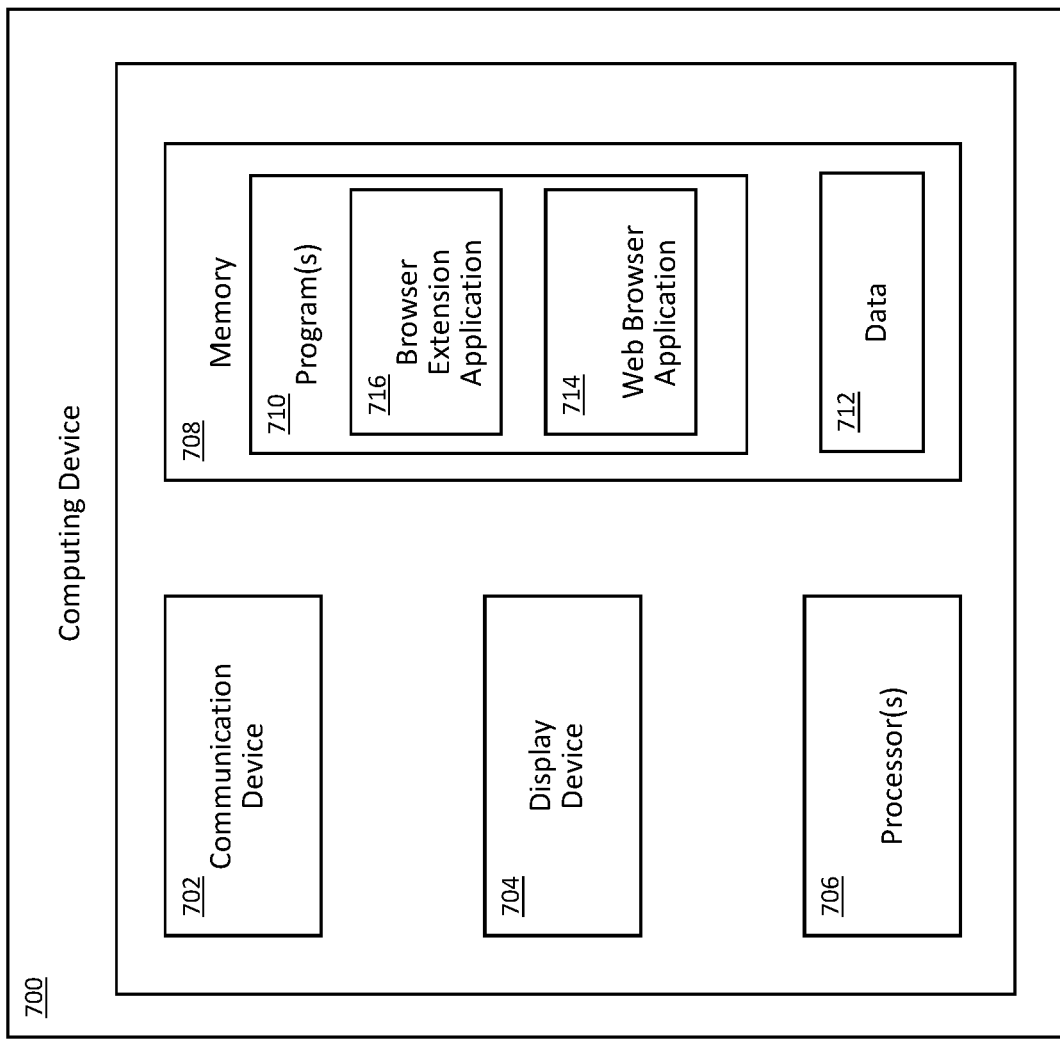
FIG. 7 is a block diagram of an exemplary computing device that may be associated with pre-authorization and purchase processing consistent with exemplary aspects of at least some embodiments of the present disclosure.

FIG. 7 is a block diagram of an exemplary computing device 700, consistent with disclosed embodiments. As shown, computing device 700 may include communication device 702, display device 704, processor(s) 706, and memory 708 including program(s) 710 and data 712. Program(s) 710 may include, among others, web browser application 714 and browser extension application 716. In some embodiments, computing device 700 may take the form of a desktop or mobile computing device, such as a desktop computer, laptop computer, smartphone, tablet, or any combination of these components. Alternatively, computing device 700 may be configured as any wearable item, including jewelry, smart glasses, or any other device suitable for carrying or wearing on a user's person. Other implementations consistent with disclosed embodiments are possible as well. Computing device 700 may, for example, be the same as or similar to computing device 502 described above.

In the example embodiment shown, communication device 702 may be configured to communicate with a browser extension server, such as browser extension servers 510 and 602 described above. In some embodiments, communication device 702 may be further configured to communicate with one or more merchant systems, such as merchant system 514 described above, and/or one or more FSP systems, such as FSP system 512 described above. Communication device 702 may be configured to communicate with other components as well. Communication device 702 may be configured to provide communication over a network, such as network 516 described above. To this end, communication device 702 may include, for example, one or more digital and/or analog devices that allow computing device 700 to communicate with and/or detect other components, such as a network controller and/or wireless adaptor for communicating over the Internet. Other implementations consistent with disclosed embodiments are possible as well.

Display device 704 may be any display device configured to display interfaces on computing device 700. The interfaces may include, for example, web pages provided by computing device 700 through web browser application 516. In some embodiments, display device 704 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 704 may also include one or more digital and/or analog devices that allow a user to interact with computing device 700, such as a touch-sensitive area, keyboard, buttons, or microphones. Other display devices are possible as well. The disclosed embodiments are not limited to any type of display devices otherwise configured to display interfaces.

Processor(s) 706 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 706 may also include various architectures (e.g., x86 processor, ARM®, etc.). The disclosed embodiments are not limited to any type of processor(s) otherwise configured to meet the computing demands required of different components of computing device 700.

Memory 708 may include one or more storage devices configured to store instructions used by processor(s) 706 to perform functions related to disclosed embodiments. For example, memory 708 may be configured with one or more software instructions, such as program(s) 710, that may perform one or more operations when executed by processor(s) 706. The disclosed embodiments are not limited to separate programs or computers configured to perform dedicated tasks. For example, memory 708 may include a single program 710 that performs the functions of computing device 700, or program(s) 710 may comprise multiple programs. Memory 708 may also store data 712 that is used by program(s) 710. In certain embodiments, memory 708 may store sets of instructions for carrying out the processes described below in connection with FIG. 8. Other instructions are possible as well. In general, instructions may be executed by processor(s) 706 to perform one or more processes consistent with disclosed embodiments.

In some embodiments, program(s) 710 may include a web browser application 714. Web browser application 714 may be executable by processor(s) 706 to perform operations including, for example, providing web pages for display. The web pages may be provided, for example, via display device 704. In some embodiments, the web pages may be associated with a merchant system, such as merchant system 514 described above. Web browser application 714 may be executable by processor(s) 706 to perform other operations as well. In some embodiments, program(s) 710 may further include a browser extension application 716. Browser extension application 716 may, for example, be the same as similar to browser extension applications 506 and 604 described above. Browser extension application 716 may be executable by processor(s) 706 to perform various operations including, for example, detecting and automatically populating transaction fields in web pages provided by computing device 700 through web browser application 714. Other instructions are possible as well. In general, instructions may be executed by processor(s) 706 to perform one or more processes consistent with disclosed embodiments.

The components of computing device 700 may be implemented in hardware, software, or a combination of both hardware and software, as will be apparent to those skilled in the art. For example, although one or more components of computing device 700 may be implemented as computer processing instructions, all or a portion of the functionality of computing device 700 may be implemented instead in dedicated electronics hardware.

Figure 8:
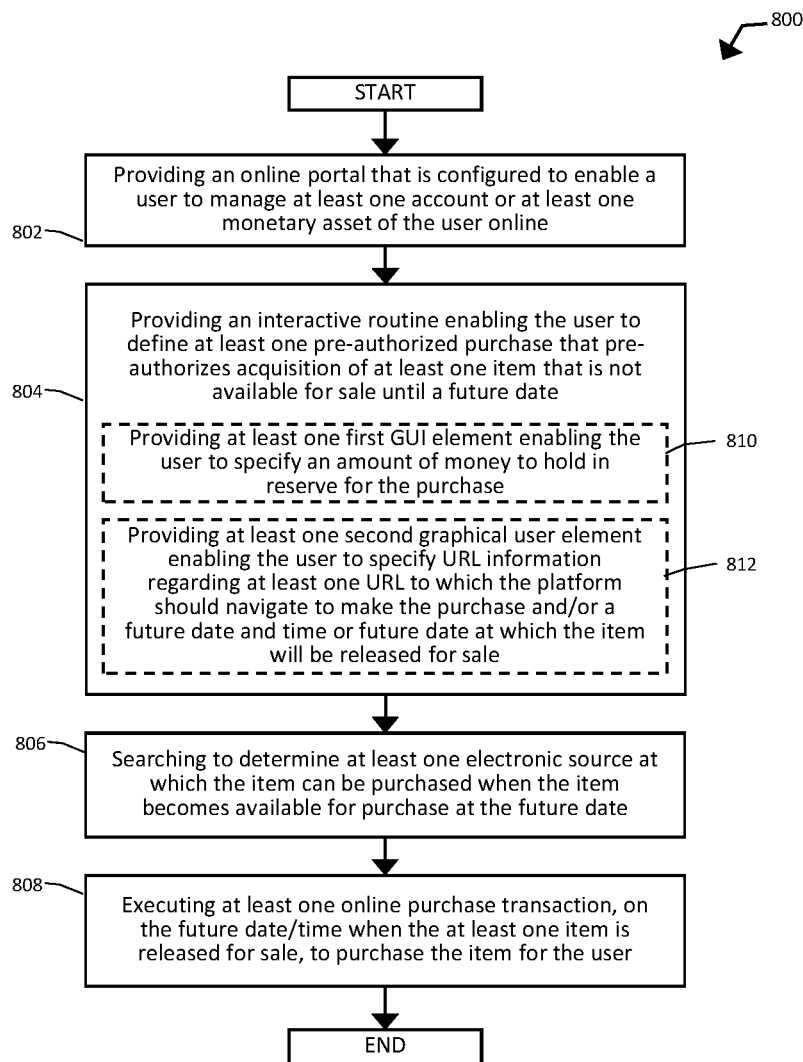
FIG. 8 is a flowchart illustrating one exemplary process related to pre-authorization and execution of future purchase transactions, consistent with exemplary aspects of at least some embodiments of the present disclosure.

FIG. 8 is a flowchart illustrating one exemplary process 800 related to pre-authorization and purchase of a desired item via a future transaction, consistent with exemplary aspects of at least some embodiments of the present disclosure. As shown in the exemplary flowchart of FIG. 8, an illustrative pre-authorization and purchase process 800 may comprise: providing an online portal that is configured to enable a user to manage at least one account or at least one monetary asset of the user online, at 802; providing an interactive routine enabling the user to define and pre-authorize the acquisition of at least one item that is not available for sale until a future date, at 804; searching to determine at least one electronic source at which the item can be purchased when the item becomes available for purchase at the future date, at 806; and executing at least one online purchase transaction, on the future date/time when the at least one item is released for sale, to purchase the item for the user, at 808. Further, the pre-authorization and purchase process 800 may be carried out, in whole or in part, online, e.g. via a Web or other network connection, and/or it may be carried out by in conjunction with a browser extension functionality, such as being performed in connection with a browser extension application, such as browser extension applications 506, 604, and 716 described above, which may be implemented via browser extension servers 510 and 602, also described above.

In some embodiments, pre-authorization and purchase process 800 may include, at 802, a step of providing an online portal that is configured to enable a user to manage at least one account or at least one monetary asset of the user online. An illustration of a user interface of one such online portal is shown and discussed in connection with FIG. 9, below. With regard to the disclosed innovations, such online portal may include various graphical user interfaces (GUIs) such as the exemplary interface and elements shown and described in connection with FIG. 9, and which may be, for example, associated with the FSP system 512. Further, the online portal may be provided via at least one computer platform, such as an online computer platform. Here, for example, the at least one computer platform may comprise a financial service provider (FSP) system 512, i.e., as disclosed above in connection with FIG. 5. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers.

The pre-authorization and purchase process 800 may include, at 804, a step of providing an interactive routine enabling the user to define and pre-authorize the acquisition of at least one item that is not available for sale until a future date. Further, according to various disclosed embodiments, the interactive routine may be provided by the at least one computer platform, via the online portal. In one embodiment, the interactive routine may comprise one or both of: providing, at 810, at least one first graphical user element enabling the user to specify an amount of money to hold for the at least one pre-authorized purchase, wherein the at least one online computer platform operates to hold or reserve the specified amount of money for the pre-authorized purchase such that the user cannot access or spend that amount; and/or providing, at 812, at least one second graphical user element enabling the user to specify at least one of: (1) URL information regarding at least one universal resource locator (URL) to which the at least one online computer platform should navigate to make the at least one purchase, (2) a future date at which the at least one item will be released for sale, and (3) the future date and a future time at which the at least one item will be released for sale. One illustrative representation of a user interface including examples of such elements is shown and described in connection with FIG. 9, below.

Pre-authorization and purchase process 800 may also include the step of searching to determine at least one electronic source at which the item can be purchased when the item becomes available for purchase at the future date, at 806, as well as the step of executing at least one online purchase transaction, on the future date/time when the at least one item is released for sale, to purchase the item for the user, at 808. In some embodiments, both steps 806 and 808 may be performed via an automated computerize routine, which, in further embodiments, be implemented in conjunction with at least one browser extension application, as set forth in more detail above and below.

With regard to the step of searching to determine at least one electronic source at which the item can be purchased, at 806, embodiments herein may be configured to search web pages to determine source and release information, such as by crawling the World Wide Web. Here, for example, implementations may be configured to scrape one or more website domains associated with the URL information provided by the user, e.g., to determine specific information needed for purchase, such as the precise link at which the purchase must be made as well as the date and time that the item is being released for sale. Further, the screen scraping may be performed via a browser extension application. Such screen scraping may include detecting transaction fields, which may involve, for example, detecting patterns within the HTML or XML used to create the web pages. Transaction fields may be detected in other manners as well. In processing such web pages as well as the associated information and fields, the browser extension application may look for key data types and values, such as merchant name, transaction or purchase amounts, shopping cart data, purchase items, dates (e.g., delivery date, etc.), numerical information (e.g., customer credit card or account numbers, etc.), other transaction data that matches the desired item, and the like. Further, the browser extension application may be programmed to immediately scrape and store such information. Such browser extension application functionality, here and below, may be executed, for example, by browser extension applications 506, 604, and 716 described above. These browser extension applications may also be executed via one or more computing devices, such as computing devices 502 and 700 described above and/or other computing devices.

The computer platform may also search other resources to which it has access, including searching such resources for other transactions that it can access, to locate a same or similar transaction. According to some embodiments, the computer platform may search transactions associated with the user, especially when the user may have one or more existing accounts associated with the computer platform. Here, for example, especially when the computer platform comprises a financial service provider (FSP) system, the computer platform may search prior financial transactions of the user that the computer system can access, i.e., to determine information such as the website domain at which the item may be purchased, related transaction data that can help the computer platform execute a purchase transaction for the item, and the like.

Moreover, particularly when the computer platform comprises a financial service provider (FSP) system, implementations herein may be configured to search prior financial transaction information for all accessible accounts and customers associated with the FSP system. Searching such 'customer' transaction information can be useful both in the initial determination of the website or URL which should be searched and/or monitored, and also during the later execution of the purchase transaction, since the specific details needed for such purchase may be readily available and determined via searching account information of other, existing customers. Several non-limiting examples of such features and functionality are described below.

In one embodiment, the searching to determine the electronic source 806 may comprise searching transaction information of customers of a financial service provider system to locate a transaction record having transaction data that is similar to the item that the user desires to purchase at the future data. Following this, based on the transaction record located, a precise web page, associated with the URL, at which the item is to be purchased at the future date, may be determined. Further embodiments may also comprise reviewing transactions of the user and/or the customers to search for transactions including a specific merchant name, a transaction amount, and/or other transaction data that matches the item that the user desires to purchase.

According to some embodiments, methods herein may also comprise searching, on the future date, transaction information of customers of the financial service provider system to locate a transaction record having transaction data that is same as the item that the user desires to purchase, and executing a purchase routine regarding the item using transaction information (e.g., URL, etc.) learned from the transaction record.

As noted above, an exemplary method may comprise executing, by the at least one online computer platform, at least one online purchase transaction, on (1) the future date or (2) the future date and the future time when the at least one item is released for sale, to purchase the at least one item for the user, e.g., at step 808. Further, such step of executing at least one online purchase transaction to acquire the item may also include or involve security aspects that help the computer platform maintain personal information of the user confidential. Here, for example, this step may include generating, via the at least one computer platform, virtual customer information associated with the user, the virtual customer information comprising virtual credentials that are utilized to purchase the item (i) in place of the user's actual credentials, to avoid security risks associated with use of the user's actual credentials, and/or (ii) without revealing the user's name, identity and/or related information on the website where the item is sold. Such virtual credentials may comprise a virtual credit or debit number associated with the user that is used in place of the user's actual credit or debit card number. According to some aspects, such virtual credentials may be utilized to obfuscate address and/or shipping information of a user. Further, in certain embodiments, such virtual credentials may be configured for a single use. Such features may be provided herein in a plurality of layers as well as be implemented by the computer platform, browser application and/or browser extension application automatically, to increase security. Here, for example, the computer platform may automatically generate a temporary, single-use account, with a temporary username and password for the user. On top of that, the computer platform may then also generate and use virtual customer information such as a virtual credit or debit number for the user. The combination of such security features, especially in an automated format, greatly reduces the risk of theft of and ensuing fraudulent activity regarding the user's financial account(s).

Other embodiments consistent with the disclosed technology may comprise, after the step of searching to determine the source 806, implementing an item tracker routine for the item that the user desires to purchase, wherein the item tracker routine monitors the web for release of the item for purchase. According to systems and methods herein, such item tracker routine may be implemented via a web browser extension.

Here, it is noted that the disclosed systems, platforms, methods, and computer-readable media include or involve a software application that may include and/or involve a browser extension configured to perform various automated functionality set forth herein. Unlike conventional software and solutions, the present innovations may utilize an improved browser extension application that may, via the specialized interactions with a dedicated portal and related software application associated with the user of a financial institution, be configured to automatically determine the electronic source at which to acquire the item as well as perform automatic searching and automatically execute a purchase transaction in the future for the desired item. In these and other manners, implementations involving the disclosed browser extension application represents an improvement over conventional web browser technologies.

The disclosed browser extension application improves utilization of both processing and search resources, such as by accessing and searching user and/or customer information to reveal details associated with purchasing the item, including the reduction of computer resources and time required to automatically arrange for future purchase of the desired item. Moreover, the improved automatic searching and purchase execution enabled by the disclosed browser extension application improves efficiency of web transactions and reduces likelihood of user exposure to online theft/fraud regarding confidential user information, thereby reducing or eliminating unnecessary and/or inefficient processing, including possible later need for human involvement, related to pre-authorizing and purchasing items desired by a user, as disclosed herein.

Figure 9:
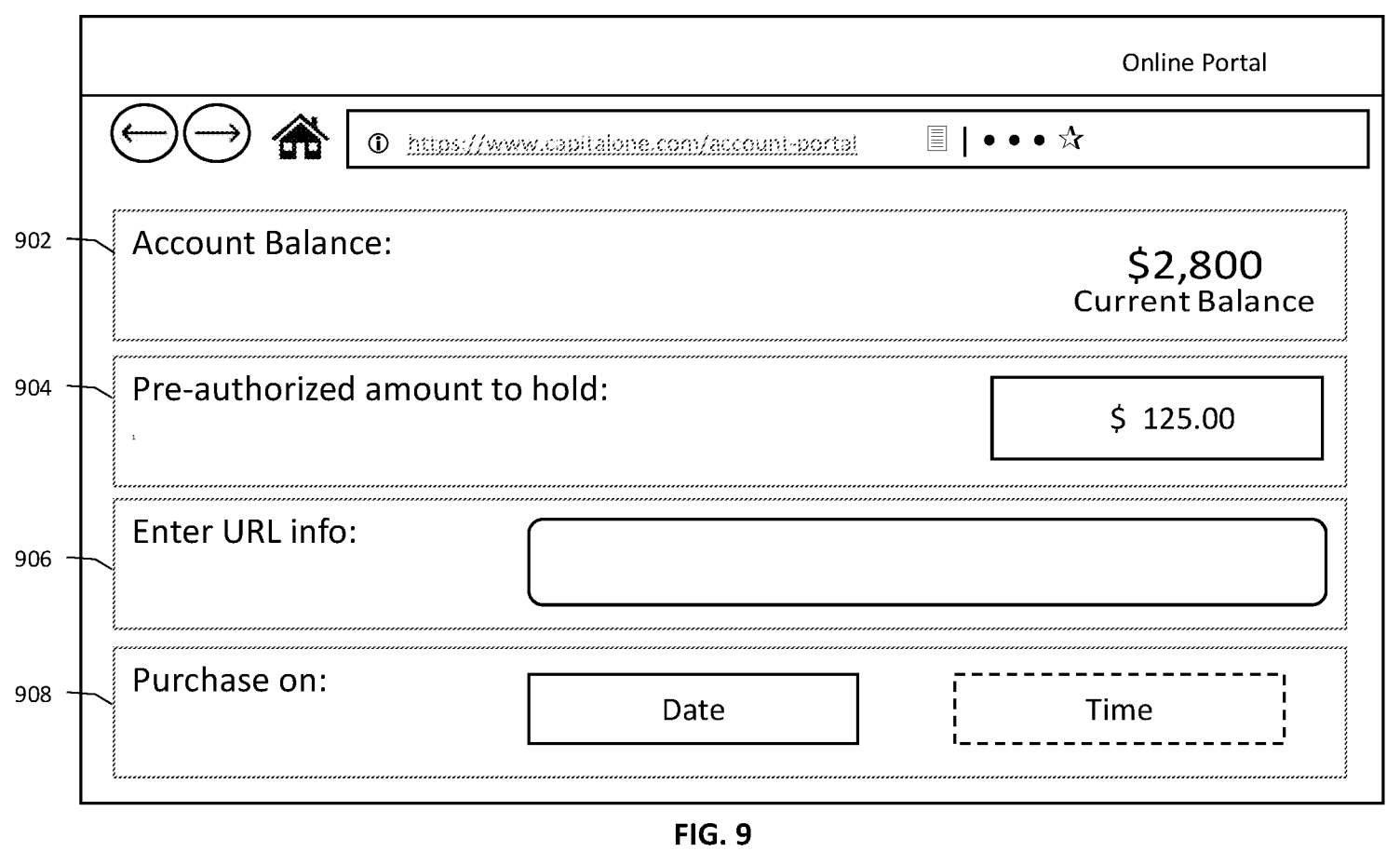

FIG. 9 is a diagram of an exemplary user interface of an online portal consistent with exemplary aspects of at least some embodiments of the present disclosure. Referring to FIG. 9, a user interface as well as exemplary aspects and GUI elements of such online portal are disclosed. As discussed above, the user interface may comprise a first field 902 showing an account balance of the user, a second field 904 to be completed by the user to establish the amount of money that the user wishes to be placed on hold for the desired item, a third field 906 into which the user may enter URL and/or other information associated with the website at which the item is to be purchased, and a fourth field 908 having graphical elements allowing the user to enter the date and, optionally, the time at which the desired item will become available for purchase.

At least some aspects of the present disclosure will now be described with reference to the following numbered clauses.

Clause 1. A computer-implemented method comprising:
providing, by at least one online computer platform, an online portal that is configured to enable a user to manage at least one account or at least one monetary asset of the user online;
providing, by the at least one computer platform, via the online portal, an interactive routine enabling the user to define at least one pre-authorized purchase that pre-authorizes an online acquisition of at least one item that is not available for sale until a future date, wherein the interactive routine comprises:
  providing at least one first graphical user element enabling the user to specify an amount of money to hold for the at least one pre-authorized purchase, wherein the at least one online computer platform causes to reserve the amount of money for the at least one pre-authorized purchase such that the user cannot access/spend the amount;
  providing at least one second graphical user element enabling the user to specify at least one of: (1) URL information regarding at least one universal resource locator (URL) to which the at least one online computer platform should navigate to make the at least one purchase, (2) a future date at which the at least one item will be released for sale, and (3) the future date and a future time at which the at least one item will be released for sale; and
searching, by the at least one online computer platform, to determine at least one electronic source at which the at least one item can be purchased when the at least one item becomes available for purchase at the future date; and
executing, by the at least one online computer platform, at least one online purchase transaction, on (1) the future date or (2) the future date and the future time when the at least one item is released for sale, to purchase the at least one item for the user.

Clause 2. The method of clause 1 or of any clause herein, further comprising:
scraping, via a browser extension, the website domain associated with the URL provided by the user, to determine the date and time that the item is being released for sale; and
automatically purchasing the item from the website domain at the date and time that the item is being released for sale.

Clause 3. The method of clause 1 or of any clause herein, wherein the searching and purchase steps are performed via an automated computerized routine that includes:
searching other transactions that the computer system can access to locate a same transaction; and
executing the same transaction on behalf of the user to obtain the item for the user.

Clause 4. The method of clause 3 or of any clause herein, wherein the computer system searches prior transactions of the user that the computer system can access to determine the website domain at which the item may be purchased.

Clause 5. The method of clause 1 or of any clause herein, further comprising:
generating, via the via at least one computer system, virtual customer information associated with the user, the virtual customer information comprising virtual credentials that are utilized to one or more of: (i) purchase the item in place of the user's actual credentials, (ii) avoid security one or more risks associated with use of the user's actual credentials, and/or (iii) purchase the item without revealing the user's name, identity and/or related information on the website where the item is sold.

Clause 6. The method of clause 5 or of any clause herein, wherein the virtual credentials one or both of: (i) comprise a virtual credit or debit number associated with the user that is used in place of the user's actual credit or debit card number; and (ii) are configured for a single use.

Clause 7. The method of clause 1 or of any clause herein, wherein the via at least one computer system comprises a financial service provider (FSP) system including one or more servers and/or processors associated with a financial service entity that provides, maintains, manages, or otherwise offers financial services.

Clause 8. The method of clause 7 or of any clause herein, wherein the financial service entity includes a bank, credit card issuer, or any other type of financial service entity that generates, provides, manages, and/or maintains financial service accounts for one or more customers.

Clause 9. The method of clause 7 or of any clause herein, further comprising:
searching transaction information of customers of the financial service provider system to locate a transaction record having transaction data that is similar to the item that the user desires to purchase at the future data; and based on the transaction record located, determining a precise web page, associated with the URL, at which the item is to be purchased at the future date.

Clause 10. The method of clause 9 or of any clause herein, further comprising:

reviewing transactions of the user and/or the customers to search for transactions including a specific merchant name, a transaction amount, and/or other transaction data that matches the item that the user desires to purchase.

Clause 11. The method of clause 7 or of any clause herein, further comprising:

searching, on the future date, transaction information of customers of the financial service provider system to locate a transaction record having transaction data that is same as the item that the user desires to purchase;

executing a purchase of the item using transaction information learned from the transaction record.

Clause 12. The method of clause 1 or of any clause herein, further comprising:

utilizing a web crawler application to scrape the web to determine a web page and/or date and time at which the item will become available for purchase at the future date.

Clause 13. The method of clause 1 or of any clause herein, further comprising:

implementing, via a web browser extension, an item tracker routine for the item that the user desires to purchase, wherein the item tracker routine monitors the web for release of the item for purchase.

Clause 14. The method of clause 1 or of any clause herein, wherein the searching to determine the at least one electronic source comprises searching web pages to determine the at least one online source.

Clause 15. A computer-implemented method comprising:

providing, by at least one online computer platform, an online portal that is configured to enable a user to manage at least one account or at least one monetary asset of the user online;

providing, by the at least one computer platform, via the online portal, an interactive routine enabling the user to define at least one pre-authorized purchase that pre-authorizes at least one purchase of at least one item that is not available for sale until a future date, wherein the routine comprises:

providing at least one first graphical user element enabling the user to specify an amount of money to hold for the at least one pre-authorized purchase, wherein the at least one online computer platform causes to reserve the amount of money for the at least one pre-authorized purchase such that the user cannot access/spend the amount;

providing at least one second graphical user element enabling the user to specify at least one of: (1) identifying information that enables the computer system to determine a website domain at which the item will be available for purchase; and, optionally, (2) a future date at which the at least one item will be released for sale, and (3) the future date and a future time at which the at least one item will be released for sale; and searching, by the at least one online computer platform, to determine at least one electronic source at which the at least one item can be purchased when the at least one item becomes available for purchase at the future date; and executing, by the at least one online computer platform, at least one online purchase transaction, on (1) the future date or (2) the future date and the future time when the at least one item is released for sale, to purchase the at least one item for the user.

Clause 16. The method of clause 15 or of any clause herein, wherein the computer system is configured to:

scrape, via a browser extension, the website domain associated with the URL provided by the user, to determine the date and time that the item is being released for sale; and automatically purchase the item from the website domain at the date and time that the item is being released for sale.

Clause 17. The method of clause 15 or of any clause herein, wherein the automated computerized routine includes:

searching other transactions that the computer system can access to locate a same transaction; and executing the same transaction on behalf of the user to obtain the item for the user.

Clause 18. The method of clause 17 or of any clause herein, wherein the computer system searches prior transactions of the user that the computer system can access to determine the website domain at which the item may be purchased.

Clause 19. The method of clause 15 or of any clause herein, further comprising:

generating, via the via at least one computer system, virtual customer information associated with the user, the virtual customer information comprising virtual credentials that are utilized to one or more of: (i) purchase the item in place of the user's actual credentials, (ii) avoid security one or more risks associated with use of the user's actual credentials, and/or (iii) purchase the item without revealing the user's name, identity and/or related information on the website where the item is sold.

Clause 20. The method of clause 19 or of any clause herein, wherein the virtual credentials are configured for a single use.

Clause 21. The method of clause 15 or of any clause herein, wherein the via at least one computer system comprises a financial service provider (FSP) system including one or more servers and/or processors associated with a financial service entity that provides, maintains, manages, or otherwise offers financial services.

Clause 22. The method of clause 21 or of any clause herein, wherein the financial service entity includes a bank, credit card issuer, or any other type of financial service entity that generates, provides, manages, and/or maintains financial service accounts for one or more customers.

Clause 23. The method of clause 22 or of any clause herein, further comprising:

searching transaction information of customers of the financial service provider system to locate a transaction record having transaction data that is similar to the item that the user desires to purchase at the future data; and based on the transaction record located, determining a precise web page, associated with the URL, at which the item is to be purchased at the future date.

Clause 24. The method of clause 23 or of any clause herein, further comprising:

reviewing transactions of the user and/or the customers to search for transactions including a specific merchant name, a transaction amount, and/or other transaction data that matches the item that the user desires to purchase.

Clause 25. The method of clause 15 or of any clause herein, further comprising searching, on the future date, transaction information of customers of the financial service provider system to locate a transaction record having transaction data that is same as the item that the user desires to purchase;

executing a purchase of the item using transaction information {e.g., URL information, etc.} learned from the transaction record.

Clause 26. The method of clause 15 or of any clause herein, further comprising:

utilizing a web crawler application to scrape the web to determine a web page and/or date and time at which the item will become available for purchase at the future date.

Clause 27. The method of clause 15 or of any clause herein, further comprising:

implementing, via a web browser extension, an item tracker routine for the item that the user desires to purchase, wherein the item tracker routine monitors the web for release of the item for purchase.

Clause 28. In addition, embodiments herein may also take the form of one or more computer readable media containing computer-executable instructions for performing any of the processing herein, the computer-executable instructions being executable via one or more processing components to process instructions regarding and/or otherwise perform one or more aspects of the functionality set forth herein.

Clause 29. Embodiments herein may also take the form of a system comprised of computing elements and/or computer-readable media that are arranged, coupled, configured, programmed and/or otherwise adapted to perform the features and functionality set forth anywhere in the present disclosure.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method, executed by one or more processors, the method comprising:
   providing, by at least one online computer platform, an online portal that is configured to enable a user to manage at least one account or at least one monetary asset of the user online;
   causing, by the at least one online computing platform, to execute a browser extension application on a computing device associated with the user, wherein the browser extension application is associated with the online portal and configured to access the at least one account or the at least one monetary asset of the user and obtain an available balance of the at least one account or the at least one monetary asset;
   generating, by the at least one online computer platform, a user interface that is displayed via the browser extension application on the computing device;
   instructing, by the at least one online computer platform, the computing device to display the user interface via the browser extension application;
   providing, by the at least one computer platform, via the online portal, the user interface including one or more interactive GUI elements on the computing device to enable the user to define at least one pre-authorized purchase that pre-authorizes at least one purchase of at least one item that is not available for sale until a future date, wherein the one or more interactive GUI elements are configured to:
      enable the user to specify an amount of money to hold, from the available balance, for the at least one pre-authorized purchase;
      cause to transmit an instruction that causes the at least one computing platform to reserve the amount of money for the at least one pre-authorized purchase such that the user cannot access or spend the amount;
      enable the user to specify one or more of: (1) identifying information that enables the computer system to determine a website domain at which the item will be available for purchase, (2) a future date at which the at least one item will be released for sale, or (3) the future date and a future time at which the at least one item will be released for sale;
   searching, by the at least one online computer platform, other transactions, to which the at least one online computer platform has access, to determine at least one electronic source at which the at least one item can be purchased when the at least one item becomes available for purchase at the future date;
   executing, by the at least one online computer platform, at least one online purchase transaction, when the at least one item is released for sale, and automatically purchasing the item when the item is being released for sale.

2. The method of claim 1, further comprising:
   scraping, via a browser extension, the at least one electronic source, to determine the date and time that the item is being released for sale; and
   automatically purchasing the item from the website domain at the date and time that the item is being released for sale.

3. The method of claim 1, wherein the searching and purchase steps are performed via an automated computerized routine that includes:
   searching other transactions that the computer system can access to locate a same transaction; and
   executing the same transaction on behalf of the user to obtain the item for the user.

4. The method of claim 3, wherein the computer system searches prior transactions of the user that the computer system can access to determine the website domain at which the item may be purchased.

5. The method of claim 1, further comprising:
   generating, via the via at least one computer system, virtual customer information associated with the user, the virtual customer information comprising virtual credentials that are utilized to one or more of: (i) purchase the item in place of the user's actual credentials, (ii) avoid security one or more risks associated with use of the user's actual credentials, and/or (iii) purchase the item without revealing the user's name, identity and/or related information on the website where the item is sold.

6. The method of claim 5, wherein the virtual credentials one or both of: (i) comprise a virtual credit or debit number associated with the user that is used in place of the user's actual credit or debit card number; and (ii) are configured for a single use.

7. The method of claim 1, wherein the via at least one computer system comprises a financial service provider (FSP) system including one or more servers and/or processors associated with a financial service entity that provides, maintains, manages, or otherwise offers financial services.

8. The method of claim 7 wherein the financial service entity includes a bank, credit card issuer, or any other type of financial service entity that generates, provides, manages, and/or maintains financial service accounts for one or more customers.

9. The method of claim 7, further comprising:
searching transaction information of customers of the financial service provider system to locate a transaction record having transaction data that is similar to the item that the user desires to purchase at the future data; and
based on the transaction record located, determining a precise web page, associated with the URL, at which the item is to be purchased at the future date.

10. The method of claim 9, further comprising:
reviewing transactions of the user and/or the customers to search for transactions including a specific merchant name, a transaction amount, and/or other transaction data that matches the item that the user desires to purchase.

11. The method of claim 7, further comprising:
searching, on the future date, transaction information of customers of the financial service provider system to locate a transaction record having transaction data that is same as the item that the user desires to purchase;
executing a purchase of the item using transaction information learned from the transaction record.

12. The method of claim 1, further comprising:
utilizing a web crawler application to scrape the web to determine a web page and/or date and time at which the item will become available for purchase at the future date.

13. The method of claim 1, further comprising:
implementing, via a web browser extension, an item tracker routine for the item that the user desires to purchase, wherein the item tracker routine monitors the web for release of the item for purchase.

14. The method of claim 1 wherein the searching to determine the at least one electronic source comprises searching web pages to determine the at least one online source.

15. A computer-implemented method, executed by one or more processors, the method comprising:
providing, by at least one online computer platform, an online portal that is configured to enable a user to manage at least one account or at least one monetary asset of the user online;
causing, by the at least one online computing platform, to execute a browser extension application on a computing device associated with the user, wherein the browser extension application is associated with the online portal and configured to access the at least one account or the at least one monetary asset of the user and obtain an available balance of the at least one account or the at least one monetary asset;
generating, by the at least one online computer platform, a user interface that is displayed via the browser extension application on the computing device;
instructing, by the at least one online computer platform, the computing device to display the user interface via the browser extension application;
providing, by the at least one computer platform, via the online portal, the user interface including one or more interactive GUI elements on the computing device to enable the user to define at least one pre-authorized purchase that pre-authorizes an online acquisition of at least one item that is not available for sale until a future date, wherein the one or more interactive GUI elements are configured to:
enable the user to specify an amount of money to hold, from the available balance, for the at least one pre-authorized purchase;
cause to transmit an instruction that causes the at least one computing platform to reserve the amount of money for the at least one pre-authorized purchase such that the user cannot access or spend the amount;
enable the user to specify one or more of: (1) identifying information that enables the computer system to determine a website domain at which the item will be available for purchase; (2) a future date at which the at least one item will be released for sale, and/or (3) the future date and a future time at which the at least one item will be released for sale;
searching, by the at least one online computer platform, transaction information of users associated with the at least one computing platform to locate a transaction record having transaction data that is similar to the item that the user desires to purchase at the future date;
determining, by the at least one online computer platform, based on the transaction record located, at least one electronic source at which the at least one item can be purchased when the at least one item becomes available for purchase at the future date; and
executing, by the at least one online computer platform, at least one online purchase transaction, when the at least one item is released for sale, and automatically purchasing the item when the item is being released for sale.

16. The method of claim 15, wherein the computer system is configured to:
scrape, via a browser extension, the at least one electronic source, to determine the date and time that the item is being released for sale; and
automatically purchase the item from the website domain at the date and time that the item is being released for sale.

17. The method of claim 15, wherein the automated computerized routine includes:
searching other transactions that the computer system can access to locate a same transaction; and
executing the same transaction on behalf of the user to obtain the item for the user.

18. The method of claim 17, wherein the computer system searches prior transactions of the user that the computer system can access to determine the website domain at which the item may be purchased.

19. The method of claim 15, further comprising:
generating, via the via at least one computer system, virtual customer information associated with the user, the virtual customer information comprising virtual credentials that are utilized to one or more of: (i) purchase the item in place of the user's actual credentials, (ii) avoid security one or more risks associated with use of the user's actual credentials, and/or (iii) purchase the item without revealing the user's name, identity and/or related information on the website where the item is sold.

20. The method of claim 19, wherein the virtual credentials are configured for a single use.

* * * * *